US006871191B1

(12) United States Patent
Kinney, Jr. et al.

(10) Patent No.: US 6,871,191 B1
(45) Date of Patent: Mar. 22, 2005

(54) METHOD AND SYSTEM FOR PARTIAL QUANTITY EVALUATED RANK BIDDING IN ONLINE AUCTIONS

(76) Inventors: Sam E. Kinney, Jr., 314 Maple La., Sewickley, PA (US) 15143; Robert G. Stevens, 5518 Ellsworth Ave., Apt. 1, Pittsburgh, PA (US) 15232; John P. Levis, III, 509 Amberson Ave., Pittsburgh, PA (US) 15232

( * ) Notice: Subject to any disclaimer, the term of this patent is extended or adjusted under 35 U.S.C. 154(b) by 0 days.

(21) Appl. No.: 09/490,877

(22) Filed: Jan. 24, 2000

(51) Int. Cl.[7] .............................................. G06F 17/60
(52) U.S. Cl. ...................................................... 705/37
(58) Field of Search ........................... 705/26, 35, 36, 705/37

(56) References Cited

U.S. PATENT DOCUMENTS

| | | | | |
|---|---|---|---|---|
| 3,581,072 | A | 5/1971 | Nymeyer | 235/152 |
| 4,674,044 | A | 6/1987 | Kalmus et al. | 364/408 |
| 4,789,928 | A | 12/1988 | Fujisaki | 364/401 |
| 4,845,625 | A | 7/1989 | Stannard | 364/407 |
| 4,992,940 | A | 2/1991 | Dworkin | 364/401 |
| 5,136,501 | A | 8/1992 | Silverman et al. | 364/408 |
| 5,193,056 | A | 3/1993 | Boes | 364/408 |
| 5,243,515 | A | 9/1993 | Lee | 364/401 |
| 5,297,032 | A | 3/1994 | Trojan et al. | 364/408 |

(List continued on next page.)

FOREIGN PATENT DOCUMENTS

| | | | |
|---|---|---|---|
| CA | | 2180995 | 1/1998 |
| CA | | 02298481 | 9/1998 |
| CA | | 02180995 | 12/1998 |
| FR | | 2733847 | 11/1996 |
| WO | | 97/37315 | 10/1997 |
| WO | WO | 98/38844 | * 9/1998 |

OTHER PUBLICATIONS

XP- 002131462; The Michigan Internet AuctionBot: A configurable auction server for human and software agents; Peter R. Wurman et al.; 1998.*
Malone et al., "The Logic of Electronic Markets", *Harvard Business Review*, No. 893II (May–Jun., 1989).
Freemarkets™ Online, "Bidware Manual" (Jun. 9, 1988).
Freemarkets Online™, "Online Industrial Market Making, An Overview of Purchasing Executives".
WebAuction.com, "How to Play" (1998).
Auction Sales, "Live Auctions Online" (Sep. 1998).
Auction Port, "Online Auction Community—New Auctions Since Sep. 2, 1998" (7/98).
OnSale, "How to Play" (1998).
u–Auction–It™ (1997).
Freemarkets Online™, "Homepage" (1998).
Andrews, "Auctions Catch the Interest of Hobbyists and Big Business", Aug. 24, 1998.
Associated Press, "Auction on Web is Buyer's Market", Apr. 6, 1998.
Steinert–Threlkeld, "New Watchwords: Let Sellers Beware", Jun. 1, 1998.
Woolley, "E–muscle", Mar. 9, 1998.
Associated Press, "FreeMarkets Takes Auction on Internet", Feb. 23, 1998.
Jahnke, "How Bazaar" (Aug. 27, 1998).
Wilder, "What's Your Bid?—FreeMarkets' real–time online bidding technology lets clients drive down costs and improve product value", Nov. 10, 1997, *Information Week*.

(List continued on next page.)

*Primary Examiner*—Pierre E. Elisca

(57) ABSTRACT

A method and system for conducting electronic online auctions having partial quantity evaluated rank bidding is disclosed. Submitted bids are ordered on a basis of a comparative bid parameter used by an originator of an auction. The quantity required by the originator of the auction is then allocated to the offered quantities of the submitted bids based upon a ranked ordering of the bids.

4 Claims, 7 Drawing Sheets

U.S. PATENT DOCUMENTS

| | | | | |
|---|---|---|---|---|
| 5,375,055 | A | 12/1994 | Togher et al. | 364/408 |
| 5,394,324 | A | 2/1995 | Clearwater | 364/402 |
| 5,402,336 | A | 3/1995 | Spiegelhoff et al. | 364/401 |
| 5,606,602 | A | 2/1997 | Johnson et al. | 379/115 |
| 5,664,115 | A | 9/1997 | Fraser | 705/37 |
| 5,684,963 | A | 11/1997 | Clement | 395/226 |
| 5,689,652 | A | 11/1997 | Lupien et al. | 395/237 |
| 5,715,402 | A | 2/1998 | Popolo | 395/237 |
| 5,727,165 | A | 3/1998 | Ordish et al. | 395/237 |
| 5,758,327 | A | 5/1998 | Gardner et al. | 705/26 |
| 5,758,328 | A | 5/1998 | Giovannoli | 705/26 |
| 5,765,138 | A | 6/1998 | Aycock et al. | 705/7 |
| 5,774,873 | A | 6/1998 | Berent et al. | 705/26 |
| 5,794,207 | A | 8/1998 | Walker et al. | 705/23 |
| 5,794,219 | A | 8/1998 | Brown | 705/37 |
| 5,797,127 | A | 8/1998 | Walker et al. | 705/5 |
| 5,799,151 | A | 8/1998 | Hoffer | 395/200.34 |
| 5,802,502 | A | 9/1998 | Gell et al. | 705/37 |
| 5,905,974 | A * | 5/1999 | Fraser et al. | 705/37 |
| 6,016,344 | A * | 1/2000 | Katz | 379/260 |
| 6,026,383 | A * | 2/2000 | Ausubel | 705/37 |

OTHER PUBLICATIONS

Jean–Pierre Banatre, et al., "The Design and Building of Enchere, a Distributed Electronic Marketing System" Communications of the ACM, No. 1 (Jan. 29, 1986).

Danny Cohen, "Computerized Commerce" Information Processing 89 (Aug. 28–Sep. 1, 1989).

Simmons, "Procurement Auctions with Multiple Sourcing," The University of York Discussion Papers in Economics, No. 95/11, p. 1–33, 1995.

Anton et al., "Split Awards, Procurement, and Innovation", RAND Journal of Economics, vol. 20, No. 4, Winter 1989, p. 538–52, 1989.

Reck, "Types of Electronic Auctions," Proceedings of the International Conference on Information and Communications Technologies in Tourism, p. 236–243, 1994.

Wurman et al., "The Michigan Internet AuctionBot: A Configurable Auction Server for Human and Software Agents," Proceedings of the Second International Conference on Autonomous Agents, p. 301–308, 1998.

Wrigley, "Design Criteria for Electronic Market Servers," Electronic Markets Journal, p. 12–16, 1997.

* cited by examiner

| | Coordinator | Buyer | Supplier |
|---|---|---|---|
| Initial Contact 102 | Contact buyer | Provide Data | |
| RFQ 104 | Collect & Administer RFQ Data | Provide RFQ Data | |
| | Publish & Administer RFQ | | Access RFQ |
| | Manage RFQ Response | | Respond to RFQ |
| Auction Administration 106 | | Request Auction | |
| | Coordinate & Administer Auction Setup | | |
| | Assist & Administer User Auction Prep | | Prepare for Auction |
| Conduct Auction 108 | Assist & Administer Auction | Observe | Bid |
| Administer Auction Results 110 | Analyze & Administer Auction Results | View Auction Results | View Auction Results |
| Contract Administration 112 | | Settlement | Settlement |

Fig. 2

|  | Quantity (tons) | Price ($/ton) | In (tons) | Out (tons) |
|---|---|---|---|---|
| Supp A's Offering | 50,000 | $19.75 | 25,000 | 25,000 |
| Supp B's Offering | 50,000 | $21.00 | 0 | 50,000 |
| Supp C's Offering | 50,000 | $20.25 | 0 | 50,000 |
| Supp D's Offering | 10,000 | $19.50 | 10,000 | 0 |
| Supp E's Offering | 20,000 | $19.80 | 0 | 20,000 |
| Supp F's Offering | 15,000 | $19.55 | 15,000 | 0 |
| Supp G's Offering | 18,000 | $20.00 | 0 | 18,000 |
|  |  | TOTAL | 50,000 |  |

Fig. 5A

|  | Quantity (tons) | Price ($/ton) | In (tons) | Out (tons) |
|---|---|---|---|---|
| Supp A's Offering | 50,000 | $19.75 | 5,000 | 45,000 |
| Supp B's Offering | 50,000 | $21.00 | 0 | 50,000 |
| Supp C's Offering | 50,000 | $20.25 | 0 | 50,000 |
| Supp D's Offering | 10,000 | $19.50 | 10,000 | 0 |
| Supp E's Offering | 20,000 | $19.70 | 20,000 | 0 |
| Supp F's Offering | 15,000 | $19.55 | 15,000 | 0 |
| Supp G's Offering | 18,000 | $20.00 | 0 | 18,000 |
|  |  | TOTAL | 50,000 |  |

Fig. 5B

METHOD AND SYSTEM FOR PARTIAL QUANTITY EVALUATED RANK BIDDING IN ONLINE AUCTIONS

BACKGROUND OF THE INVENTION

The disclosed invention relates generally to conducting online electronic auctions, and in particular to online electronic auctions featuring partial quantity evaluated rank bidding.

Traditional Procurement Models

Procurement of supplies has traditionally involved high transaction costs, especially information search costs. The introduction of electronic commerce has introduced new methods of procurement that lower some of the transaction costs associated with procurement. Online procurement, or business-to-business electronic commerce, matches buyers and suppliers so that transactions can take place electronically. There are three models for online procurement: catalog, buyer-bidding auction, and supplier-bidding auction.

The "catalog" model of online procurement was the first to be developed. The first electronic catalogs were developed by suppliers to help customers obtain information about products and order supplies electronically. These first electronic catalogs were single-source; i.e. they only allowed customers to obtain information and products from that supplier.

However, customers are not typically satisfied with being "locked in" to one supplier—they wanted to be able to compare a number of competing products to be sure of getting the product features they wanted, at the best price. So suppliers with single-source electronic catalogs started to include competitors' products on their systems. An example of this is American's SABRE system, which includes offerings from competing suppliers (airlines), thereby further reducing information search costs. By offering competing products, the electronic catalog that offers competitor's products becomes an "electronic market".

Many of these systems are biased towards the supplier offering the electronic market. Procurement costs can be further lowered with an unbiased electronic market that promotes competition.

For standard products and services, the need to have an unbiased market has been met for many industries by third party "market makers." For example, Inventory Locator Services has compiled a database that lists all airplane parts suppliers that have a certain item in stock. Buyers dial into the database to get information on the parts they need. Here, it is a third party, Inventory Locator Service, not a supplier, creating the unbiased electronic market.

The electronic catalog model of electronic commerce involves one buyer and one supplier at a time. When many buyers compete for the right to buy from one supplier, a buyer-bidding auction model is created. A noteworthy example of the buyer-bidding auction model is that operated by PriceLine.com and described in U.S. Pat. No. 5,794,207 issued to Walker et al. In this system, potential buyers compete for airline tickets by submitting a bid for an airline ticket on the PriceLine website, and airlines can choose to accept a bid, thereby committing the buyer to buy the ticket.

The catalog and buyer-bidding auction types of electronic markets do not work in some situations however. If the required product is custom made for the buyer, it is not possible for suppliers to publish a set price in advance for a catalog market. Likewise, it is not possible for buyers to specify all of the details of the product they want to purchase in a buyer-bidding auction. Traditionally, when a company requires a custom industrial product, procurement is made by a buyer for the company who searches for a potential supplier and acquires custom-tailored price quotes from a supplier for the needed custom product. The search is slow and somewhat random because it usually relies heavily on personal relationships. The costs associated with locating vendors, comparing their products, negotiating, and paperwork become big factors in a purchase decision. The cost of switching suppliers is very large, which means that the quoted price is probably not the lowest fair price and that it is hard for a new supplier to enter the market.

As an alternative, buyers use auctions to save money. The assignee of the present application developed a system wherein suppliers downwardly bid against one another to achieve the lowest market price in a supplier-bidding auction.

Supplier-Bidding Auction

In a supplier-bidding auction, bid prices typically start high and move downward in reverse-auction format as suppliers interact to establish a closing price. The auction marketplace is one-sided, i.e. one buyer and many potential suppliers. Typically, the products being purchased are components or materials. "Components" typically mean fabricated tangible pieces or parts that become part of assemblies of durable products. Example components include gears, bearings, appliance shelves, or door handles. "Materials" typically mean bulk quantities of raw materials that are further transformed into product. Example materials include corn syrup or sheet steel.

Industrial buyers do not typically purchase one component at a time. Rather, they purchase whole families of similar components. At times, components are strongly related to one another. As an example, a buyer might purchase a given plastic knob in two different colors, or might purchase a nameplate in four different languages. These parts are so similar that by definition they must be purchased from the same supplier—all of the knobs are made using the same mold. These items are therefore grouped into a single lot. Suppliers in industrial auctions must provide unit price quotes for all line items in a lot.

Auction Process

The process for a supplier-bidding auction is described below with reference to FIGS. 1 and 2. FIG. 1 illustrates the functional elements and entities in a supplier-bidding auction, while FIG. 2 is a process diagram that identifies the tasks performed by each of the involved entities.

The supplier-bidding auction model requires that the bidding product or service be defined by the buyer 10. An auction coordinator 20 works with buyers 10 to prepare for and conduct an auction and to define the potentially new supply relationships resulting from the auction.

As shown in FIG. 2, in the Initial Contact phase 102 of the auction process, the coordinator 20 contacts the buyer 10, and the buyer 10 provides data to the coordinator 20. The coordinator 20 prepares a specification 50 for each desired product or part 52. Once the product 52 is defined, potential suppliers 30 for the product are identified. The coordinator 20 and buyer 10 work together to compile this list of potential suppliers from suppliers already known to the buyer 10 as well as suppliers recommended by the coordinator 20.

The buyer 10 makes a decision regarding which potential suppliers 30 will receive invitations to the upcoming Auction. Suppliers 30 that accept Auction invitations are then sent notices regarding the upcoming Auction, as well as client software to install in preparation of participating in the Auction.

In the RFQ phase 104, the coordinator 20 works with the buyer 10 to prepare a Request for Quotation ("RFQ") 54. The coordinator 20 collects and maintains the RFQ data provided by buyer 10, and then publishes the RFQ 54, and manages the published RFQ 54. The RFQ 54 includes specifications 50 for all of the parts 52 covered by the RFQ 54. In the RFQ 54, buyer 10 aggregates similar part or commodity line items into job "lots." These lots allow suppliers 30 to bid on that portion of the business for which they are best suited.

During the auction 56, bids 58 will be taken against individual lots (and their constituent parts 52) within RFQ 54. While suppliers 30 must submit actual unit prices for all line items, the competition in an Auction is based on the aggregate value bid for lots. The aggregate value bid for a lot depends upon the level and mix of line item bids and the quantity for each line item. Therefore, suppliers 30 submit bids at the line item level, but compete on the lot level.

In the Auction Administration phase 106, coordinator 20 coordinates the Auction and administers the Auction setup and preparation. The coordinator 20 sends a RFQ 54 to each participating supplier 30, and assists participating suppliers 30 with preparation for the Auction.

In the Auction phase 108, suppliers 30 submit bids 58 on the lots and monitor the progress of the bidding by the participating suppliers 30. The coordinator 20 assists, observes, and administers the Auction.

When the bidding period is over, the auction enters the Auction Results Administration phase 110. In this phase, coordinator 20 analyzes and administers the Auction results, which are viewed by buyer 10. The buyer 10 begins to conduct final qualification of the low bidding supplier(s). The buyer 10 retains the right not to award business to a low bidding supplier 30 based on final qualification results or other business concerns.

In the ensuing Contract Administration phase 112, the coordinator 20 facilitates settlements 60 awarded by the buyer 10 to suppliers 30. Contracts 52 are then drawn up between buyer 10 and suppliers 30.

Communications and Software

The Auction is conducted electronically between potential suppliers 30 at their respective remote sites and the coordinator 20 at its site. As shown in FIGS. 3 and 4, information is conveyed between the coordinator 20 and the suppliers 30 via a communications medium such as a network service provider 40 accessed by the participants through, for example, dial-up telephone connections using modems, or direct network connections. A computer software application is used to manage the Auction. The software application has two components: a client component 31 and a server component 23. The client component 31 operates on a computer at the site of each of the potential suppliers 30. The client component is used by suppliers 30 to make bids during the Auction. The bids are sent via the network service provider 40 to the site of the coordinator, where it is received by the server component 23 of the software application. The client component 31 includes software used to make a connection through telephone lines or the Internet to the server component 23. Bids 58 are submitted over this connection and updates are sent to connected suppliers.

Bids 58 can only be submitted using the client component 31 of the application—this ensures that buyers do not circumvent the bidding process, and that only invited suppliers participate in the bidding. Typically, bidders can see their bids and bids placed by other suppliers for each lot on the client component 31. When a bidder submits a bid, that bid is sent to the server component 23 and evaluated to determine whether the bid is from an authorized bidder, and whether the bid has exceeded a pre-determined maximum acceptable price. Bids placed by a supplier are broadcast to all connected bidders thereby enabling every participating bidder to see quickly the change in market conditions and begin planning their competitive responses.

SUMMARY OF THE INVENTION

Conventional auctions focus on price as the sole variable upon which the competition for an auction item is based. Price is the primary bidding parameter that is provided by the bidders and hence is the primary parameter upon which a selection process is made.

In many auction markets, however, quantity is an equally significant parameter that can influence the dynamics of an auction. Consider, for example, a downward-price, supplier-bidding auction for 50,000 tons of coal. Participation in the bidding for the lot of 50,000 tons of coal is often restricted to large coal suppliers. Smaller, hungry coal suppliers that can offer more competitive pricing are often precluded from participating in the auction because they cannot supply the entire requested 50,000 tons.

The present invention increases the competitiveness within such an auction by enabling the auction system to process bids for portions of a specified lot. Offering the entire specified lot quantity is not a condition for participation in the auction. In the present invention, the offered quantities in the submitted bids are used to allocate all or part of the specified lot quantity based upon an ordered ranking of received bids.

The ordered ranking can be based upon values of a competitive bid parameter that is used by the originator of the auction. In one embodiment, the ordered ranking is based upon price values submitted by the bidders. In another embodiment, the ordered ranking is based upon a competitive bid parameter that is generated through a transformation function defined by the originator of the auction. The transformation function takes as inputs price and non-price variables that affect the overall valuation of the transaction.

In a still further embodiment, an optimization routine can be implemented to minimize the total cost. In this embodiment, bids are evaluated together by an optimization program using linear programming or integer programming techniques. For example, in a coal auction where suppliers are offering different types of coal, the optimization routine can be designed to determine whether some mix of coal "a" and "c" would in fact be more attractive than "b" alone given their respective current bid prices and the values of non-price parameters.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 2 illustrates the tasks performed by the entities involved in an auction process;

FIGS. 5A and 5B illustrate an example user interface according to the present invention.

DETAILED DESCRIPTION

Figure 1:
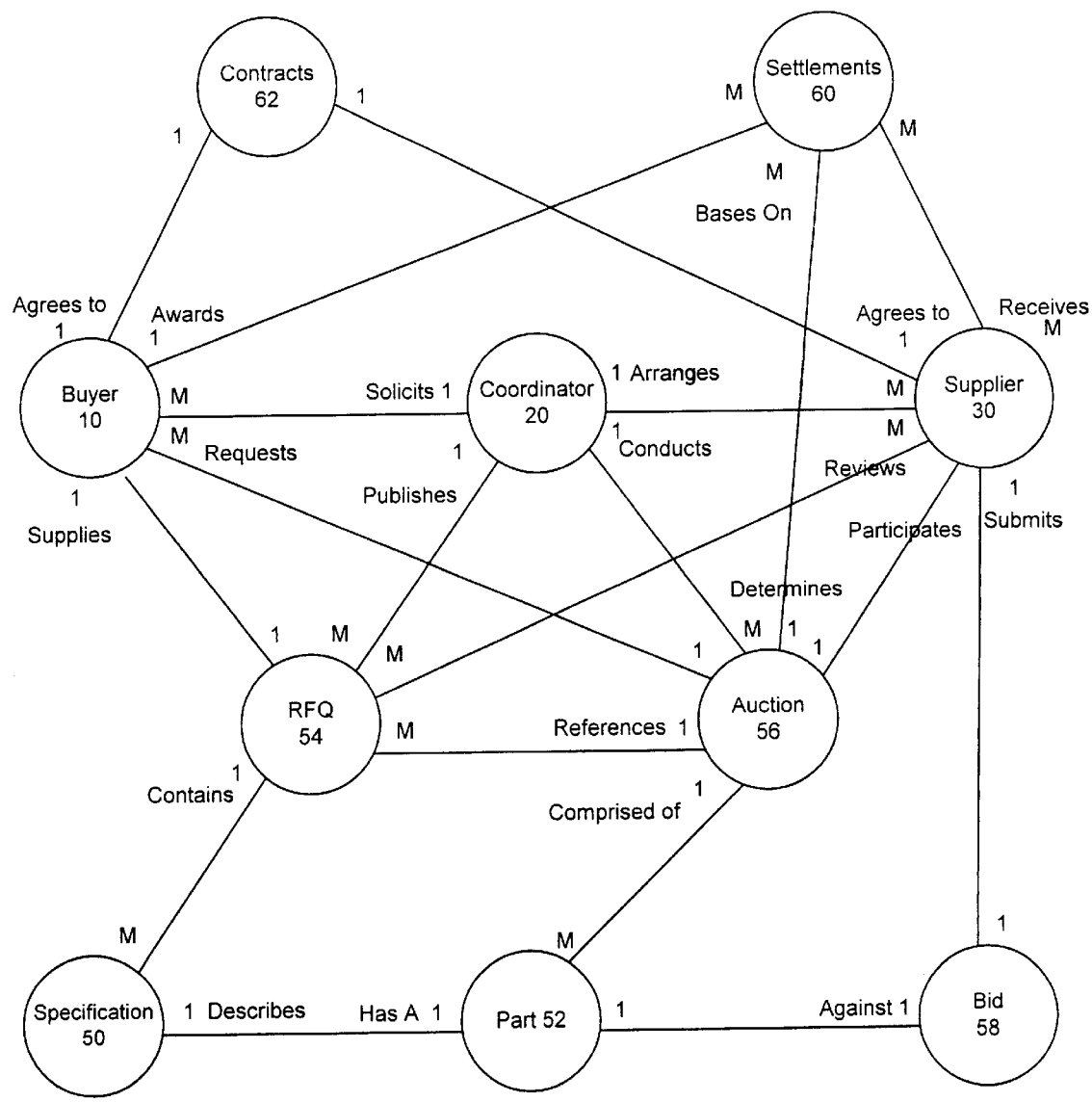
FIG. 1 illustrates the elements and entities involved in an auction process.
Figure 3:
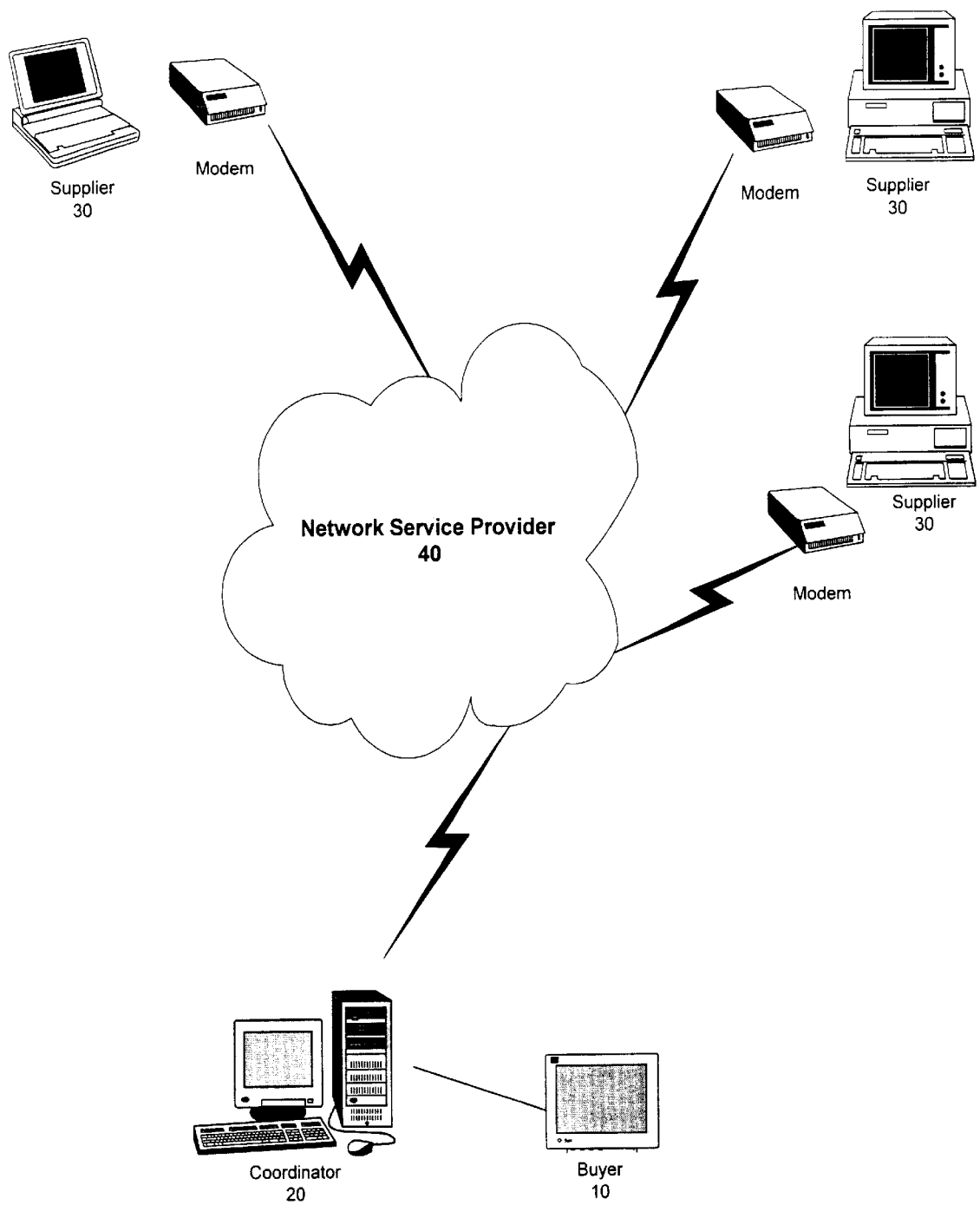
FIG. 3 illustrates the communications links between the coordinator and the potential suppliers in an auction.
Figure 4:
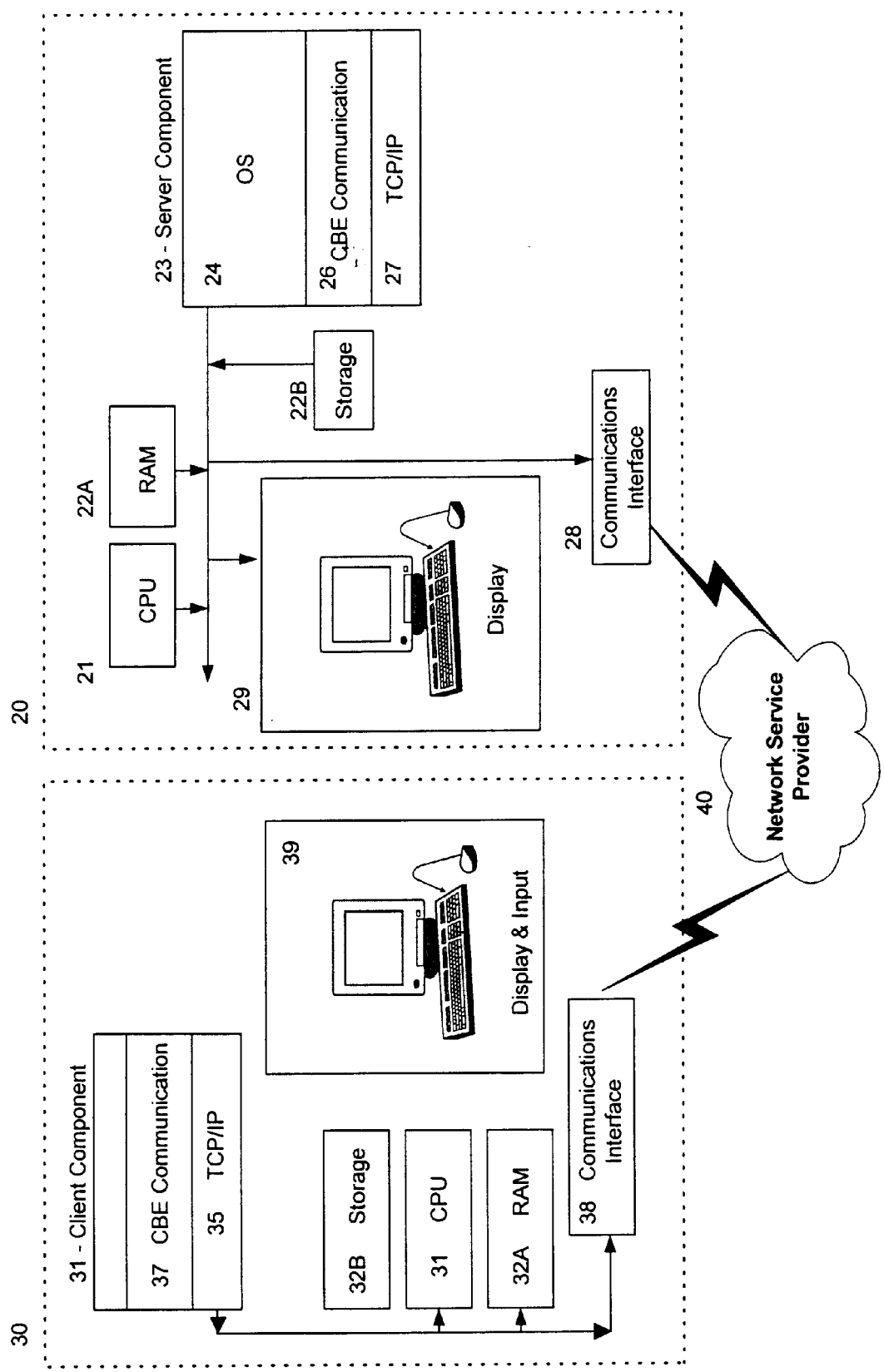
FIG. 4 illustrates the client and server components of the computer software application that conducts the auction and the hardware at the sites of the coordinator and the potential suppliers on which the client and server components operate.

Reference will now be made in detail to the preferred embodiments of the present invention, examples of which are illustrated in the accompanying drawings. The present invention described below extends the functionality of the inventive electronic auction system and method described in greater detail in co-pending application Ser. No. 09/252,790, entitled "Method and System for Conducting Electronic Auctions," filed Feb. 19, 1999, the disclosure of which is hereby expressly incorporated in the present application.

Online electronic auctions provide a powerful interactive medium for creating and capitalizing upon traditional auction dynamics. The extensive reach of online electronic auctions combined with inherent forms of anonymity make it an attractive choice for virtually any auction sale. Online electronic auctions enable potential bidders to view a rapidly changing auction landscape as hundreds of bids can easily be processed within a few hours.

One of the key elements in creating an electronic auction market is the identification of a uniform auction item upon which competition will be based. The specification of a uniform auction item enables the auction system to process the various competing bids based solely upon the price quotes submitted by the participating bidders. For example, an originator of an auction can define an item (e.g., golf club) that the originator is willing to sell or can define an item that the originator is willing to buy.

In most cases, this conventional auction system is sufficient to capture the necessary interest required to create a viable auction competition. In some markets, however, the auction originator's demands might be too great. For example, consider an industrial auction market where the originator of the auction is a buyer seeking to purchase a lot of 50,000 tons of coal. Eligible bidders for the sale of the entire 50,000 tons of coal would be confined to large coal suppliers. Smaller coal suppliers that cannot deliver 50,000 tons of coal would be ineligible to participate in the auction. Restricting the set of potential suppliers (or bidders) in the auction market also limits the potential auction dynamic. Smaller, hungry suppliers can often offer lower prices for a smaller volume. Unfortunately, while the smaller suppliers are in a position to drive the market lower, they are precluded from participating.

This limitation on the market is illustrated in the context of a set of potential suppliers A–G. For each supplier A–G, Table 1 identifies the maximum quantity (tons) of coal that the individual supplier can supply as well as that supplier's best "walk-away" price. For example, supplier A can offer 60,000 tons of coal at a minimum of $19.75/ton. In this example, it is assumed that suppliers A–G are each offering coal of the same quality.

TABLE 1

Potential Supplier Offerings

| Supplier | Available Quantity (tons) | Best Price if Pushed |
| --- | --- | --- |
| A | 60,000 | $19.75/ton |
| B | 50,000 | $21.00/ton |
| C | 75,000 | $20.25/ton |
| D | 10,000 | $19.00/ton |
| E | 20,000 | $19.30/ton |
| F | 15,000 | $19.10/ton |
| G | 18,000 | $20.00/ton |

In an environment having suppliers A–G defined in Table 1, an auction market for a lot of 50,000 tons of coal would be sub-optimal because it excludes potential suppliers D–G. As illustrated, suppliers D–G can only supply 10,000 tons, 20,000 tons, 15,000 tons, and 18,000 tons, respectively. The actual auction market therefore consists of a competition between suppliers A–C. The results of this limited auction market are summarized in Table 2.

TABLE 2

Scenario #1 (50,000 ton lot)

| Supplier | Available Quantity (tons) | Competitive Status |
| --- | --- | --- |
| A | 60,000 | In at $20.24/ton |
| B | 50,000 | Out at $21.00/ton |
| C | 75,000 | Out at $20.25/ton |
| D | 10,000 | Not Eligible |
| E | 20,000 | Not Eligible |
| F | 15,000 | Not Eligible |
| G | 18,000 | Not Eligible |

As illustrated, suppliers A–C compete until supplier B drops out at his "walk-away" price of $21.00/ton. Suppliers A and C then compete until supplier C drops out at his "walk-away" price of $20.25/ton. As the last bidder remaining in the limited auction market, supplier A can stop on a price that is slightly under the "walk-away" price of supplier C. In Table 2, this final price is illustrated as $20.24/ton. The total cost for the buyer in this scenario is therefore $20.24/ton*50,000 tons=$1,012,000.

As stated above, this limited auction market is sub-optimal because suppliers D–G cannot influence the market. In the scenario detailed above, any one of suppliers D–G could have caused supplier A to lower his selling price from $20.24/ton.

To encourage the participation of smaller suppliers, the buyer can choose to specify smaller lots of coal. For example, instead of defining a single lot of 50,000 tons, the buyer can specify two lots of 25,000 tons each. The definition of two separate lots of coal, however, may not have the advantageous effect of garnering a lower price for the buyer.

One problem with defining two lots of 25,000 tons of coal is that the lowered quantity requirement may still be too high for a given market. In the environment of suppliers A–G of Table 1, suppliers D–G are still ineligible to compete in the auction market. To enable supplier E to compete, the buyer would have to separate the 50,000 tons of coal into three lots of similar quantity. Excessive splitting of a single lot into multiple lots is disadvantageous to the buyer due to the additional complexity of the transaction. Multiple auctions would replace the single auction for the 50,000 tons of coal.

A further problem introduced by the splitting of a lot is illustrated by the auction dynamic created through the specification of two separate 25,000 ton lots of coal. This scenario is illustrated in Table 3.

TABLE 3

Scenario #2 (Two 25,000 ton lots)

| Supplier | Available Quantity (tons) | Competitive Status Lot 1 | Lot 2 |
|---|---|---|---|
| A | 60,000 | In at $20.30/ton | Out at $20.75/ton |
| B | 50,000 | Out at $21.00/ton | Out at $21.00/ton |
| c | 75,000 | Out at $20.31/ton | In at $20.74/ton |
| D | 10,000 | Not Eligible | Not Eligible |
| E | 20,000 | Not Eligible | Not Eligible |
| F | 15,000 | Not Eligible | Not Eligible |
| G | 18,000 | Not Eligible | Not Eligible |

As noted above, the reduction of the lot minimum from 50,000 tons to 25,000 tons is insufficient to include the participation of suppliers D–G. In the auctions for the two separate 25,000 ton lots (Lots 1 and 2) it is assumed that the closing times of the two auctions will occur sequentially. In other words, the auction for Lot 1 will close before the auction for Lot 2.

In the auction for Lot 1, suppliers A–C compete until supplier B drops out at his "walk-away" price of $21.00/ton. Suppliers A and C then compete until supplier C drops out at $20.31/ton. In this example, supplier C drops out above his "walk-away" price of $20.25/ton because the smaller lot size of 25,000 tons does not generate as much interest for supplier C. Supplier C has 75,000 tons of coal to offer and is looking to make a significantly larger sale.

As the last bidder remaining in the limited auction market for Lot 1, supplier A can end on a price that is slightly under the last price of supplier C. In Table 3, this ending price is illustrated as $20.30/ton. At this point, a disadvantage of splitting a 50,000 ton lot into multiple lots is readily apparent. Although the buyer is seeking to promote more competition by reducing the lot size, the buyer has inadvertently raised his buying price for half of his requirement from $20.24/ton to $20.30/ton.

With the auction for Lot 1 being closed, suppliers A–C can now concentrate on bidding for the 25,000 tons of coal in Lot 2. In the auction for Lot 2, suppliers A–C compete again until supplier B drops out at his "walk-away" price of $21.00/ton. Suppliers A and C then compete against each other. Significantly, supplier A is not as "hungry" in the bidding for Lot 2 because he has already secured a sale of 25,000 tons of coal based upon his success in the auction for Lot 1. Supplier A thus has a much lower incentive to approach his original "walk-away" price of $19.75/ton. In fact, the sequential closing of multiple lots has changed supplier A's behavior by enabling supplier A to modify his "walk-away" price upward to $20.75/ton. After supplier A drops out at $20.75/ton, supplier C doesn't have to approach his "walk-away" price of $20.25/ton and can sit on a final offer of $20.70/ton.

The buyer in this two-lot scenario is in a worse position as compared to the results of the single lot auction. Whereas the single lot auction resulted in total cost for the buyer of $1,012,000, the two-lot auction resulted in a total cost for the buyer of $20.30/ton*25,000 tons+$20.70/ton*25,000 tons= $1,025,000.

Neither the single-lot auction nor the two-lot auction is able to effectively include the competitive presence of the smaller, hungry suppliers. Based on conventional auction implementations, the smaller, hungry suppliers can only be included if the lot size becomes small enough. Reducing the lot size, however, has the undesired effect of reducing the interest of the larger suppliers. This tradeoff is reflective of a deficiency in conventional auction systems of specifying a winner-take-all auction.

The present invention represents a significant shift away from a winner-take-all auction by increasing the competitive dimensions upon which the auction process is run. The auction process of the present invention is not run solely on the basis of price. Instead, the auction process of the present invention is based upon the combination of price and quantity. This feature of the present invention allows an originator of the auction to benefit from the individual competitiveness of the smaller bidders.

To illustrate the features of the present invention, consider a third coal auction scenario where a buyer specifies a single 50,000 ton lot with a 10,000 ton minimum. In this scenario, all of the smaller suppliers D–G are eligible to participate. The smaller suppliers D–G cannot supply the entire 50,000 tons of coal and are therefore competing for a portion of the lot of 50,000 tons of coal. At the same time, large suppliers A–C are attempting to secure the sale of the entire lot of 50,000 tons of coal. In this auction environment, the auction system of the present invention is not simply comparing the relative price values of received bids. Rather, the auction system of the present invention analyzes submitted bids based upon price and quantity.

It should be noted that a given supplier can have more than one offering. For example, a supplier can compete with two types of coal. For simplicity, it is assumed at this point that each supplier competes with only one offering.

Table 4 illustrates a possible result of the auction that is driven by the additional competitiveness of the smaller suppliers.

TABLE 4

Scenario #3 (50,000 ton lot w/10,000 ton Minimum)

| Supplier | Available Quantity (tons) | Competitive Status |
|---|---|---|
| A | 60,000 | Stops at $19.75/ton |
| B | 50,000 | Out at $21.00/ton |
| C | 75,000 | Out at $20.25/ton |
| D | 10,000 | Stops at < $19.75/ton |
| E | 20,000 | Stops at < $19.75/ton |
| F | 15,000 | Stops at < $19.75/ton |
| G | 18,000 | Out at $20.00/ton |

As noted, the specification of a 10,000 ton minimum enables smaller suppliers D–G to drive the market. In the auction for the single lot, the entire set of potential suppliers A–G compete until supplier B drops out at his "walk-away" price of $21.00/ton. Suppliers A and C–G then compete until supplier C drops out at his "walk-away" price of $20.25/ton. Next, suppliers A and D–G compete until supplier G drops out at his "walk-away" price of $20.00/ton.

At this point in the auction, suppliers A and D–F are the remaining competing suppliers. Based upon the price data in Table 1, suppliers D–F can clearly beat the best price of supplier A. However, suppliers D–F in combination can only supply 45,000 of the 50,000 tons required by the buyer. Accordingly, supplier A will be able to secure at least a portion of the 50,000 ton lot.

The auction system of the present invention is not a winner-take-all environment. Rather, each bidder can end up with a portion of the overall requirement. Significantly, their captured portion of the overall requirement can represent only a fraction of the overall quantity for which they are bidding. For example, a supplier can offer to supply 30,000 tons out of a 50,000 ton requirement specified by the buyer. At the end of the auction, the supplier may capture only 20,000 tons of the 30,000 tons that he originally offered.

The concept of fractional allocation to the participating suppliers is illustrated by the example buyer user interface of FIGS. 5A and 5B. The buyer user interface of FIGS. 5A and 5B includes an offering column 510, an offered quantity column 520, an offered price column 530, an "In" column 540, and an "Out" column 550. Generally, each row in the table of the buyer user interface defines an offering against which suppliers amend their bids. The quantity and price values in columns 520 and 530, respectively, identify the basic components of the submitted bid. "In" column 540 and "Out" column 550, on the other hand, represent status information for the submitted bid. In particular, "In" column 540 identifies the amount of a submitted bid that has been accepted, while "Out" column 550 identifies the amount of a submitted bid that has been rejected.

At any point in time, a submitted bid can be accepted in its entirety, partially accepted, or rejected in its entirety. Acceptance during the course of an ongoing auction is conditional because bids are not finally accepted until the close of the auction. Indeed, during the course of the auction, the status of a submitted bid can be readily changed based upon the movement of fractional quantities of the auction item between "In" column 540 and "Out" column 550.

The relevance of the buyer user interface of FIGS. 5A and 5B is now explained in the continuing description of auction scenario #3. As noted above, after suppliers B, C, and G drop out of the auction, suppliers A and D–F are the remaining competing suppliers. As illustrated in FIG. 5A, the relevant rows corresponding to the offers of suppliers B, C, and G indicate that no part of their offer has been accepted, or considered as being "In." In other words, their entire offered quantity of 50,000, 50,000, and 18,000, respectively, is included in "Out" column 550.

FIG. 5A also illustrates the current state of competition between suppliers A and D–F. Supplier D has the leading market bid of $19.50/ton for 10,000 tons. The 10,000 ton quantity is illustrated as being "In" in its entirety. Supplier F has the next leading market bid of $19.55/ton for 15,000 tons. The 15,000 ton quantity is also illustrated as being "In" in its entirety. By the acceptance of the bids of supplier D and supplier F, half (i.e., 25,000 tons) of the buyer's specified requirement of 50,000 tons has been accounted for.

The remaining 25,000 tons is currently attributed to supplier A, who has the third leading bid of $19.75/ton. Supplier A's bid of 50,000 tons can only be partially accepted because the buyer would be better off by accepting the bids for the 25,000 tons offered by the combined bids of supplier D and supplier F if the auction were to close now. Accordingly, supplier A's offering of 50,000 tons is split between "In" column 540 and "Out" column 550. Finally, supplier E's bid of $19.80/ton for 20,000 tons has been rejected in its entirety and is illustrated as being "Out" in its entirety.

In the state of the auction illustrated in FIG. 5A, supplier E is currently above his "walk-away" price of $19.30/ton. Supplier E can therefore choose to lower his bid. The illustration of the buyer user interface in FIG. 5B captures the state of the auction after supplier E has submitted a new bid of $19.70/ton, down from $19.80/ton. In response to the new bid of supplier E, the auction server component recalculates the state of the auction.

In the recalculation process, the auction server component determines that supplier E's new offering of $19.70/ton is better (i.e., lower) than supplier A's existing offering of $19.80/ton. Supplier E's offering of 20,000 tons is therefore accepted as indicated in the movement of the quantity of 20,000 tons from supplier E's "Out" column 550 to supplier E's "In" column 540. Having accepted supplier E's offering of 20,000 tons along with supplier D's 10,000 tons and supplier F's 15,000 tons, the auction system then determines that only 5,000 tons is remaining to be filled. This 5,000 tons is attributed to the next best bidder (supplier A) at $19.75/ton. As illustrated in FIG. 5B, supplier A's previous status of 25,000 "In" and 25,000 "Out" has been changed to 5,000 "In" and 45,000 "Out."

At this point in the auction, supplier A is at his "walk-away" price of $19.75/ton for 50,000 tons. Supplier A, however, could choose to modify his bid by altering both the price and volume parameters of his bid. For example, supplier A could choose to bid beneath his floor of $19.75/ton by reducing the amount of coal that he was offering to sell. For example, if supplier A was under pressure to sell at least 30,000 tons of coal, he could modify his original bid of 50,000 tons of coal at $19.75/ton to a new bid of 30,000 tons of coal at $19.65/ton. That new bid would beat supplier E's latest offering of $19.70/ton and therefor the remaining 25,000 tons of the requirement would be allocated to supplier A instead of supplier E.

It should be noted that in modifying an existing bid, a supplier is prevented from reducing the volume parameter below the volume indicated in his "In" column. This action would be akin to "unbidding."

As it is assumed, however, that supplier A would be unwilling to lower his bid, the auction ends in the state shown in FIG. 5B. In this state, the total cost for the buyer is $19.75/ton*5,000 tons+$19.70/ton*20,000 tons+$19.55/ton*15,000 tons+$19.55/ton*10,000 tons=$981,000. As compared to the results of $1,012,000 and $1,025,000 for scenarios #1 and #2, respectively, the non-winner-take-all environment of the present invention produces increased benefit for the buyer.

In a preferred embodiment, a supplier user interface includes only the row(s) of the buyer user interface that reflect that supplier's bid(s). For example, supplier A's user interface can be configured to display the contents of only the first row of the buyer user interface of FIGS. 5A and 5B. By restricting the supplier user interface to that supplier's offerings, the supplier does not know how far below the cutoff price he is. This enables the buyer to extract a greater amount of surplus from the supplier who is willing to go the lowest. In other words, the supplier may be "In" by more than he would want to be "In" if he knew what exactly the cutoff point was. If supplier A has submitted two offerings for different types of coal, then supplier A's user interface would display the contents of two rows of the buyer user interface.

It is thus a feature of the present invention that each of the suppliers can readily view their current status of one or more submitted offerings in a fractional manner. In this non-winner-take-all environment, each supplier can potentially end up with only a portion of the overall requirement. At any point in time, a submitted bid can be accepted in its entirety, partially accepted, or rejected in its entirety.

If the auction server component is responsible for determining the relative competitiveness of bids, then the auction server component would transmit status information (e.g., "In" volume and "Out" volume) to the various client components. This status information is used by the client components to generate the user interface for the supplier.

The determination of the change in bidding status for the bids submitted by various participating suppliers is effected through a stacked-ranked ordering process. An embodiment of the stacked-ranked ordering process of the present invention is illustrated in the flowchart of FIG. 6.

In a preferred embodiment, the stacked-ranked ordering process is implemented in the auction server component, and can be performed in whole or in part upon the receipt of each additional bid. In a preferred embodiment, status information such as the "In" and "Out" quantities are transmitted to the client component of participating suppliers for display in a supplier user interface. The receipt of these parameters by the client component would enable the client component to create a supplier user interface that would include part of the buyer user interface of FIGS. 5A and 5B.

In an alternative embodiment, elements of the stacked-ranked ordering process are implemented by the client component upon receipt of the appropriate bidding parameters (e.g., price and quantity values) for bids submitted by all competing suppliers.

Figure 6:
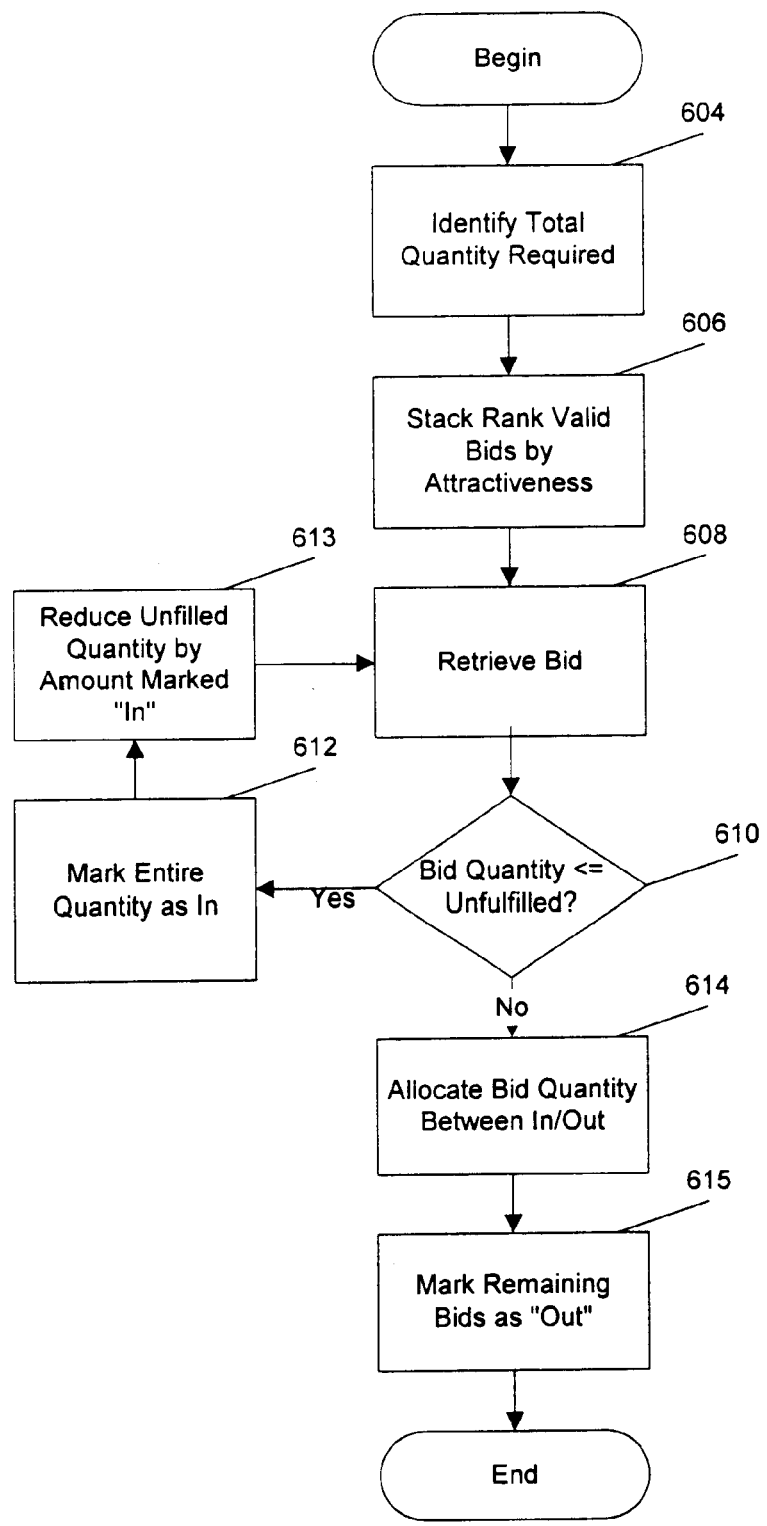
FIG. 6 illustrates a stacked-ranked ordering process.

As illustrated in the flowchart of FIG. 6, the stacked-ranked ordering process begins at step 604 where the total quantity required by the originator of the auction is identified. In the context of scenario #3 described above, the total required quantity would be 50,000 tons of coal. At step 606, each of the valid bids are stacked-ranked in accordance with their relative attractiveness. In one embodiment, the relative attractiveness of competing bids is based upon the relative values of the prices offered by the participating bidders.

After the bids have been stacked-ranked, the most attractive bid (e.g., bid having the lowest price in a downward auction) is retrieved at step 608. The quantity associated with the retrieved bid is then compared to the unfilled quantity of the originator of the auction. Initially, the unfilled quantity is equivalent to the total quantity specified by the originator of the auction.

If the bid quantity is less than or equal to the unfilled quantity, then the entire offered quantity of the retrieved bid is accepted and considered as "In." The unfilled quantity is thereby reduced by the quantity that has been accepted at step 613. The process then loops back to step 608 where the next bid in the stacked-ranked bid list is retrieved. If the offered quantity of the retrieved bid is greater than the unfilled quantity, then the offered quantity is partially accepted and the remainder is rejected at step 614. As soon as the required quantity is reached, the loop is exited and all further offerings are marked "Out" in their entirety at step 615.

The stacked-ranked ordering process of FIG. 6 is now explained with reference to the state of the auction illustrated in FIG. 5A. In the state of FIG. 5A, the loop of steps 608–610–612 has been repeated twice as the bids for supplier D and supplier F are accepted in their entirety. At that point in the stacked-ranked ordering process, the unfilled quantity is equivalent to 25,000 tons. The next bid to be retrieved at step 608 is the bid for supplier A. The offered quantity (i.e., 50,000 tons) of the bid for supplier A is greater than the unfilled quantity of 25,000 tons. Accordingly, step 614 is invoked and the offered quantity is split equally between "In" and "Out," with the remaining 25,000 tons required by the buyer being fulfilled by supplier A. The bids of suppliers B, C, E and G are marked "Out" at step 615.

In the context of the state of the auction illustrated in FIG. 5B, the stacked-ranked ordering process is re-invoked upon the receipt of the new bid by supplier E. This results because supplier E's bid forces a re-ranking of the bids within the active portion of the auction market where the status of bids is changing.

If the stacked-ranked ordering process is re-run in its entirety upon the receipt of supplier E's bid, then steps 608–610–612 would be repeated twice on the bids for supplier D and supplier F. The bids for supplier D and supplier F are accepted in their entirety. The next bid to be retrieved at step 608 is the bid for supplier E. The offered quantity (i.e., 20,000 tons) of the bid for supplier E is less than the unfilled quantity of 25,000 tons. Accordingly, step 612 marks the entire quantity as being "In." At this point, the unfilled quantity is 5,000 tons. This 5,000 tons is allocated to supplier A, who has the next best bid at $19.75/ton. Step 615 is invoked to mark as "Out" the bids of suppliers B, C and G.

In the stacked-ranked ordering process described above, the ranking is performed relative to a submitted price. These price comparisons are permissible if the bidders are bidding identical goods. For example, as noted above, it was assumed in the coal market auction scenario that each of the bidders were bidding the same type of coal.

Generally, however, all coal is not created equal. Coal is typically unique to the mine of origin. Coal can be characterized using measures such as thermal content, percentage sulfur, percentage ash, percentage water/moisture, hardness, etc. The uniqueness in the coal dictates that buyers can value the same lot of coal in a different manner depending upon their relative weighting of the various coal characteristics. The buyer's situation is also relevant to the valuation of the coal because the time frame of required delivery, the types of power generation units used by the buyer, etc. can also affect the buyer's valuation of a lot of coal. In many cases, the buyer is ultimately interested in the price per unit energy produced when the coal is processed through their power generation unit.

A mechanism is therefore required to transform each of the submitted bids into a context that enables the buyer to effect an apples-to-apples comparison in choosing the most competitive bid. Typically, bids for coal are submitted on a price per physical measure of weight or volume (e.g., $/ton) basis. As noted, the raw $/ton bids of the participating suppliers cannot be readily compared to each other due at least in part to the underlying differences in the characteristics of the coal. Thus, a transformation process is needed to transform the $/ton bids for unique lots of coal into standardized units of value to the buyer (e.g., price-per-unit-of-energy bids such as cents/Million BTU or cents/KWH). After all of the $/ton bids are transformed into standardized units of value, the buyer can readily identify the market leading bids.

General transformation bidding is described in greater detail in co-pending application Ser. No. 09/282,157, entitled "Method and System for Conducting Electronic Auctions with Multi-Parameter Price Equalization Bidding," filed Mar. 31, 1999, the disclosure of which is hereby expressly incorporated in the present application.

Figure 7:
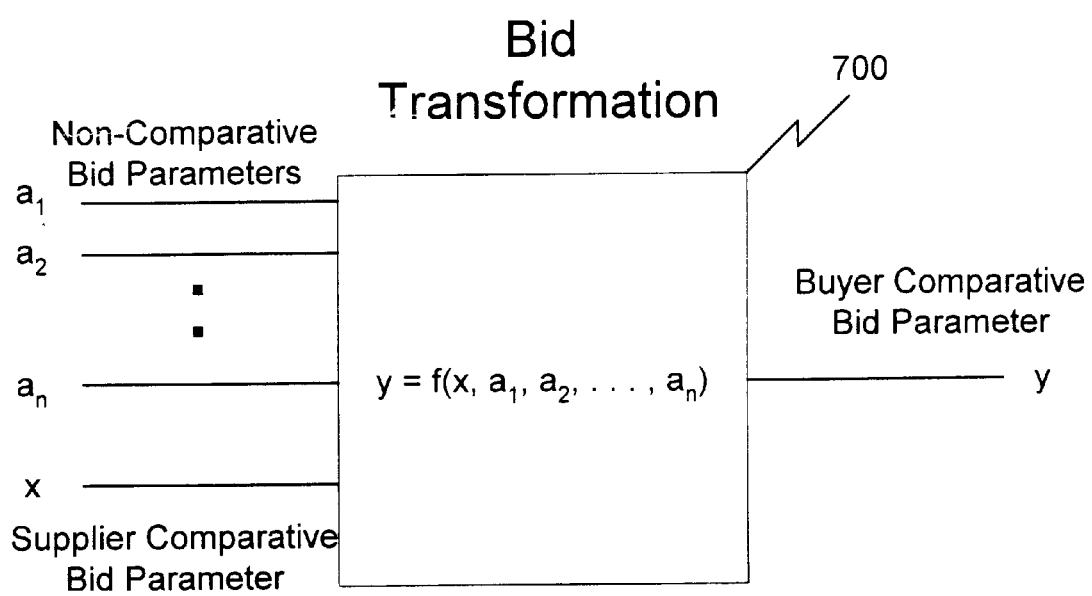
FIG. 7 illustrates a generic transformation function.

The general transformation mechanism is illustrated in FIG. 7. As illustrated, bid transformation 700 represents a function (f) that is operative on input variables (x) and ($a_1 \ldots a_n$). In the context of downward-price, supplier-bidding auctions, input variables ($a_1 \ldots a_n$) represent non-comparative bid parameters, while input variable (x) represents a supplier comparative bid parameter (e.g., price). The output of bid transformation 700 is the buyer comparative bid parameter (y).

In one embodiment, the bid transformation function (f) is a linear or non-linear analytic function that is calculated in real-time. In another embodiment, the bid transformation function (f) is a linear or non-linear function that is implemented via lookup tables. In yet another embodiment, the transformation function is a combination of an analytic linear function, analytic non-linear function, and table lookup function. The combination can be nested more than one layer deep.

In the generic description of the transformation process in FIG. 7, two types of comparative bid parameters exist. A buyer comparative bid parameter (y) refers to a parameter, resulting from the transformation process, upon which the buyer will compare competing bids. A supplier comparative bid parameter (x), on the other hand, refers to an input to the transformation function (f).

As noted, non-comparative bid parameters are also used as inputs to the transformation process. Unlike supplier comparative bid parameters, non-comparative bid parameters (e.g., non-price parameters) are not directly used to compare competing bids.

In this transformation framework, a supplier comparative bid parameter value can be modified by the transformation process based upon non-comparative bid parameter values to yield a buyer comparative bid parameter value. Competition between bids is based on the relative magnitude of the values of the buyer comparative bid parameter associated with each of the bidders.

The transformation function used in the coal market has been modeled as a linear transformation. This transformation can be represented by the algebraic function $y=mx+b$, where m is the multiplicative factor, b is the additive factor, x is the supplier comparative bid parameter (e.g., raw $/ton bid), and y is the buyer comparative bid parameter (e.g., transformed cents/Million BTU bid). Both the multiplicative and additive factors are based upon characteristics (e.g., coal characteristics, delivery specifications, etc.) of a submitted bid.

Bids viewed in the buyer's context have been converted into the buyer comparative bid parameter (e.g., cents/Million BTU). If a supplier is permitted to view bids submitted by other competing suppliers, then those bids are detransformed from their representation as a buyer comparative bid parameter to a comparative bid parameter for that supplier. This detransformation is accomplished by solving the transformation formula for x to yield the formula $x=(y-b)/m$. In this detransformation process, cents/Million BTU bid values, that are to be broadcast to supplier A, are converted to $/ton bid values using the multiplicative and/or additive factors for supplier A. This detransformation has the effect of allowing supplier A to compare his prices with other prices, as if all other bidders were bidding the exact same non-price factors as supplier A.

The transformation framework described above can be used in combination with the stacked-ranked ordering process of FIG. 6. Instead of stacked-ranked ordering bids based upon the offered prices (e.g., $/ton values), the stacked-ranked ordering process is performed upon calculated buyer comparative bid parameters (e.g., cents/Million BTU values). Thus, prior to the execution of step 606 in the stacked-ranked ordering process of FIG. 6, each of the submitted $/ton values are transformed into cents/Million BTU or other buyer comparative bid parameter values.

After the quantity values of the submitted bids have been allocated between the "In" and "Out" categories, the status information is transmitted to the participating suppliers. The corresponding status of each of the submitted bids is displayed in a buyer user interface as illustrated in FIGS. 5A and 5B. As noted above, in a preferred embodiment, each of the suppliers can view the status of their own bids. Information on competing bids is not available. If a supplier is permitted access to details of competing bids, then the relative price offerings for competing suppliers are detransformed into that supplier's own context. To facilitate this supplier-specific view, cents/Million BTU values are detransformed into $/ton values using the multiplicative and additive factors defined for that supplier.

In another embodiment, an optimization routine can be implemented to minimize the buyer's total cost. Rather than performing a linear, non-linear, or lookup table transformation of individual bids, the bids are evaluated together by an optimization program using linear programming or integer programming techniques.

In linear or integer programming, the value of an "objective function" is mathematically optimized (either maximized or minimized) subject to the rate of tradeoff between available resources and the constraints on the availability of those resources. Linear or integer program applications are useful for finding the mix of resources to feed into a manufacturing or conversion process to minimize the cost of that process. It should be noted that an objective function can be defined to be maximized or minimized. For example, an auction originator might choose to minimize cost or maximize profit.

For example, consider three types of coal having different specifications a, b, and c. In a simple linear transformation algorithm, the auction server would rank the coals in order of their attractiveness. Assume that a linear transformation would find coal b to be the most attractive. An optimization algorithm can improve on that outcome. For example, the optimization algorithm may determine that some mix of coal a and c would in fact be more attractive than b alone. Optimization techniques such as linear programming or integer programming can be designed to find such a solution. Integer programs are used when the solution must be the best "whole number" combination. For example, in purchasing coal, a buyer wishes to buy in whole train car or barge load increments. Thus in an application like coal, an integer program might be preferred to a linear program, which can yield fractional solutions.

In the present invention, the market information fed back to auction participants is not simply a recitation of the other bids in the market, nor a simple transformation of bids into a common format. Rather, the present invention enables an interactive auction where the value of one bid is affected by the parameters and price attached to other bids in the market.

In this manner, the auction server may automatically "split" lots. For example, a bidder might have submitted a bid for 1000 tons of coal, yet the auction server instantaneously calculates that the buyer's desired solution includes only 400 tons of that coal. Further, a bid can "come from behind" due to interactions with other bids. A bid that might have initially been "rejected" might subsequently be accepted when another received bid forces a re-optimization. In operation, the optimization routine runs each time a bid is received. Thus, unlike most optimizations that are run once, the present invention allows the optimization to be re-run interactively.

While the invention has been described in detail and with reference to specific embodiments thereof, it will be apparent to one skilled in the art that various changes and modifications can be made therein without departing from the spirit and scope thereof. In particular, it should be noted that while the auction functions described above have been described in the context of downward-price, supplier-bidding auctions, the principals can be equally applied to upward-price, buyer-bidding auctions. For example, the principals can be applied to a case where a seller wishes to dispose of 1000 tons of recyclable paper waste, yet some buyers wish to purchase only 100 tons. Thus, it is intended that the present invention cover the modifications and variations of this invention provided they come within the scope of the appended claims and their equivalents.

What is claimed is:

1. A method for processing bidding information in the auctioning of a lot, defined by an originator of the auction, amongst a plurality of bidders, comprising the steps of:
   (a) determining a first allocation of a total quantity required by the originator of the auction, among a first set of bids submitted by the plurality of bidders, based upon a relative competitiveness of said first set of bids, said bids each having a price and a quantity set by said bidders and said relative competitiveness determined from at least said price and said quantity; and
   (b) determining, upon a submission of a new bid in the auction, a second allocation of said total quantity required by the originator of the auction, among a second set of bids that includes said first set of bids and said new bid, based upon a relative competitiveness of said second set of bids, wherein said second allocation splits said total quantity among at least two bidders,
wherein steps (a) and (b) are performed by at least one computer, and said steps (a) and (b) comprise the steps of:
   (1) generating a ranked ordered list of said received bids based upon relative values of a comparative bid parameter of said submitted bids; and
   (2) repeating the following steps for said ranked ordered list of said received bids until an unfilled quantity requirement is entirely satisfied:
      (i) selecting a bid in said ranked ordered list;
      (ii) determining whether an offered quantity for said bid is less than an unfilled quantity requirement;
      (iii) if said offered quantity is less than said unfilled quantity requirement, then identifying said offered quantity as being accepted and identifying the difference between said offered quantity and said unfilled quantity requirement as an updated unfilled quantity requirement;
      (iv) if said offered quantity is greater than said unfilled quantity requirement, then identifying a portion of said offered quantity, equivalent to said unfilled quantity requirement, as being accepted; and
      (v) if said updated unfilled quantity requirement is zero, then rejecting all remaining bids in the ranked ordered list.

2. A computer program product for enabling a processor in a computer system to process bidding information in the auctioning of a lot, defined by an originator of the auction, amongst a plurality of bidders, said computer program product comprising:
   a computer usable medium having computer readable program code means embodied in said medium for causing an application program to execute on the computer system, said computer readable program code means comprising,
   computer readable program code means for enabling the computer system to determine a first allocation of a total quantity required by the originator of the auction, among a first set of bids submitted by a plurality of bidders, based upon a relative competitiveness of said first set of bids, and, upon a submission of a new bid in the auction, a second allocation of said total quantity required by the originator of the auction, among a second set of bids that includes said first set of bids and said new bid, based upon a relative competitiveness of said second set of bids, wherein said second allocation splits said total quantity among at least two bidders,
   wherein said computer readable program code means comprises a second computer readable program code means for enabling the computer system to generate a ranked ordering of submitted bids,
   wherein said second computer readable program code means comprises a third computer readable program code means for enabling the computer system to generate a ranked ordering of submitted bids in accordance with a comparative bid parameter used by the originator of the auction, and
   wherein said third computer readable program code means comprises:
   computer readable program code means for enabling the computer system to generate a ranked ordered list of said submitted bids based upon relative values of a comparative bid parameter of said submitted bids;
   computer readable program code means for enabling the computer system to select a bid in said ranked ordered list;
   computer readable program code means for enabling the computer system to determine whether an offered quantity for said bid is less than an unfilled quantity requirement;
   computer readable program code means for enabling the computer system to identify said offered quantity as being accepted and identifying the difference between said offered quantity and said unfilled quantity requirement as an updated unfilled quantity requirement, if said offered quantity is less than said unfilled quantity requirement;
   computer readable program code means for enabling the computer system to identify a portion of said offered quantity, equivalent to said unfilled quantity requirement, as being accepted, if said offered quantity is greater than said unfilled quantity requirement; and
   computer readable program code means for enabling the computer system to identify said offered quantity as being rejected if said updated unfilled quantity requirement is zero.

3. A system for processing bidding information in the auctioning of a lot, defined by an originator of the auction, amongst a plurality of bidders, comprising:
   means for identifying a total quantity required by the originator of the auction; and
   means for determining a first allocation of said total quantity required by the originator of the auction, among a first set of bids submitted by a plurality of bidders, based upon a relative competitiveness of said first set of bids; and, upon a submission of a new bid in the auction, determining a second allocation of said total quantity required by the originator of the auction, among a second set of bids that includes said first set of bids and said new bid, based upon a relative competitiveness of said second set of bids, wherein said second allocation splits said total quantity among at least two bidders,
   wherein said means for determining includes means for generating a ranked ordering of submitted bids, and wherein said means for generating includes:

means for generating a ranked ordered list of said submitted bids based upon relative values of a comparative bid parameter of said submitted bids used by the originator of the auction;

means for selecting a bid in said ranked ordered list;

means for determining whether an offered quantity for said bid is less than an unfilled quantity requirement;

means for identifying said offered quantity as being accepted and identifying the difference between said offered quantity and said unfilled quantity requirement as an updated unfilled quantity requirement, if said offered quantity is less than said unfilled quantity requirement; and means for identifying a portion of said offered quantity, equivalent to said unfilled quantity requirement, as being accepted, if said offered quantity is greater than said unfilled quantity requirement.

4. A method for processing bidding information in the auctioning of a lot amongst a plurality of bidders comprising:

generating, using at least one computer, a ranked ordered list of bids received from said plurality of bidders based upon relative values of a comparative bid parameter of said submitted bids; and repeating the following steps for said ranked ordered list of said received bids until an unfilled quantity requirement is satisfied:

(i) selecting a bid in said ranked ordered list;

(ii) determining whether an offered quantity for said bid is less than an unfilled quantity requirement;

(iii) if said offered quantity is less than said unfilled quantity requirement, then identifying said offered quantity as being accepted and identifying the difference between said offered quantity and said unfilled quantity requirement as an updated unfilled quantity requirement;

(iv) if said offered quantity is greater than said unfilled quantity requirement, then identifying a portion of said offered quantity, equivalent to said unfilled quantity requirement, as being accepted; and (v) if said updated unfilled quantity requirement is zero, then rejecting all remaining bids in the ranked ordered list.

* * * * *